J. ELDER.
DEVICE FOR TESTING PIPES OR PIPE JOINTS.
APPLICATION FILED FEB. 5, 1914.
1,133,714.
Patented Mar. 30, 1915.
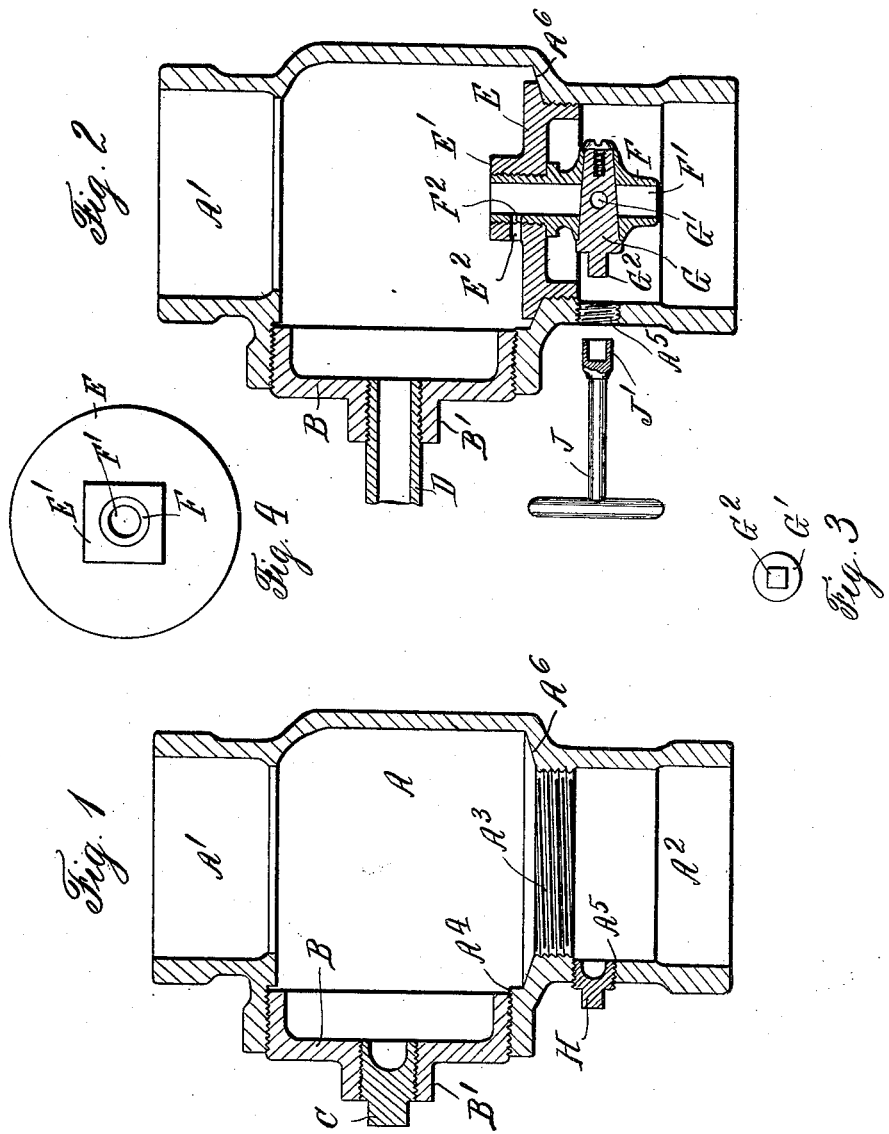
WITNESSES:
INVENTOR
JOHN ELDER
BY
ATTORNEY

UNITED STATES PATENT OFFICE.

JOHN ELDER, OF NEW YORK, N. Y.

DEVICE FOR TESTING PIPES OR PIPE-JOINTS.

1,133,714.  Specification of Letters Patent.  Patented Mar. 30, 1915.

Application filed February 5, 1914. Serial No. 816,715.

*To all whom it may concern:*

Be it known that I, JOHN ELDER, a citizen of the United States, and a resident of the borough of Manhattan, city, county, and State of New York, have invented certain new and useful Improvements in Devices for Testing Pipes or Pipe-Joints, of which the following is a specification.

My invention relates to devices for testing pipes, and particularly the joints thereof, and has for its object to provide a simple and inexpensive arrangement for testing pipes, and especially drain pipes such as are used in buildings. The several parts of the device are readily accessible, and the amount of water required for testing purposes is comparatively small, being readily transferred from one story to the story below as the testing progresses.

A typical form of my invention will now be described with reference to the accompanying drawings, and the novel features will then be pointed out in the appended claims.

In said drawings, Figure 1 is a vertical section of a portion of a drain pipe or waste pipe, adapted to receive my improved testing device, and showing the plugs which normally close the openings through which the testing device and the key for operating its valve are introduced; Fig. 2 shows the testing parts in position; Fig. 3 is an end view of the plug of the valve employed by me for discharging the water used for testing; and Fig. 4 is a top view of the disk or casing carrying said valve.

A designates a portion of a drain pipe or the like, having an inlet A' connected with the story above, and an outlet $A^2$ connected with the story below, assuming this pipe to be used in an ordinary building. Between the main chamber of said pipe portion or casing A, and the outlet $A^2$, is arranged an internal screw-thread $A^3$, and above said screw-thread, the casing A is provided with a lateral opening $A^4$, also screw-threaded, of considerably larger diameter than the threaded portion $A^3$.

Below the screw-thread $A^3$, the casing A has a small lateral opening $A^5$, also screw-threaded, said opening being preferably on the same side as the opening $A^4$. Normally, as shown in Fig. 1, the lateral opening $A^4$ is closed by a screw-plug B, provided with a central (screw-threaded) opening B', normally closed by a (screw) plug C. The lateral opening $A^5$ is normally closed by a (screw) plug H. With the parts in this position, (Fig. 1), the drain pipe will have its usual operation.

When it is desired to test the pipe, or its joints, I employ the parts shown in Figs. 2, 3, and 4. The plug or cover B is removed, and through the opening $A^4$ I then introduce a carrier E, screw-threaded externally to fit the screw-thread $A^3$, and provided with a shoulder to fit a corresponding seating surface $A^6$ within the casing A. The carrier E has a vertical opening (preferably screw-threaded) to receive the upper tubular end of a valve casing F, provided with a longitudinal passage F' registering at times with the way G' of the valve plug G. The disk-like carrier E has an angular upward projection E' to which a wrench may be applied through the opening $A^4$, said projection preferably extending above the level of the bottom of the opening $A^4$. The carrier E having been applied as shown in Fig. 2, (the valve G being closed), the cover B is placed in its original position, the plug C is removed, and in its place I insert the screw-threaded end of a pipe D suitably connected with a water supply. In this manner the portion of the drain pipe above the casing A is filled with water to the desired height, thus testing the pipe and the joints. The test having been completed, the water contained above the carrier or disk E is let off by opening the valve G, for which purpose the plug H is removed so that a wrench J having a suitable socket or operating portion J' may be applied to the angular end portion $G^2$ of the valve plug G. In order that the water may be drained fully from the upper portion of the pipe, the carrier E and the valve casing F are provided with registering transverse ducts $E^2$, $F^2$ respectively, immediately above the upper surface of the carrier E, so that even the water contained below the upper end of the projection E', but above the upper surface of the carrier disk proper, will be drained when the valve G is opened. The water having thus been allowed to run off into the lower portion of the drain pipe, the pipe D is disconnected, the cover B (which has an angular shank B' so that a wrench may be applied thereto) is again removed, and the valve casing E is unscrewed and taken out through the opening A⁴, which of course is made large enough to allow the valve casing E to pass through it readily. The cover B and plugs C, H are then applied again, thus restoring the parts to the condition shown in Fig. 1.

I prefer to apply a construction such as disclosed herein, at every eighth (or tenth) floor of a building, as may be most convenient, since with this arrangement I can test the entire piping of the building with a small amount of water. Thus, with the parts in the position shown in Fig. 2, if we imagine that on some floor below, there is another valve casing such as E, in the same position as in Fig. 2, it will be obvious that upon opening the valve G at the upper story, the water will not run off to the sewer, but will be retained in the pipe between the two valves, so that this particular section of the pipe will be tested. In this manner, the water may be transferred from one section to the next section below, so that only a small amount of water will be required for testing. Of course, while I prefer to provide at a plurality of points, the arrangements shown in Fig. 1, it would be sufficient to have only two carriers E with their valves G, since only two carriers would be in use at the same time, and such carriers would be transferred from one story to another as the testing operation progresses.

Various modifications may be made without departing from the nature of my invention as set forth in the appended claims. For instance, it will be obvious that the pipe portion A may be inverted, but in this case the valve casing F must be placed on the other side of the collar E so that it will be accessible through the larger opening A⁴ of the pipe portion A. The smaller opening A⁵ may then be used for admitting water. When used in this manner it will not be necessary to close the larger opening during the testing operation.

I claim as my invention:

1. The combination of a pipe portion provided with an internal screw-thread and with two lateral screw-threaded openings at opposite sides of said internal screw-thread, the diameter of one of said lateral openings being greater than that of the internal screw-thread, a cover for closing the last-named opening and provided with a threaded passage, a plug for closing said passage, another plug for closing the other opening, a valve casing adapted to screw on said internal screw-thread and provided with a through passage, and a valve controlling said passage and arranged to register with one of the lateral openings on said pipe portion.

2. The combination of a pipe portion provided with an internal screw-thread and with two lateral openings at opposite sides of said internal screw-thread, the diameter of one of said lateral openings being greater than that of said internal screw-thread, means for closing said openings, a carrier adapted to screw on said internal screw-thread and provided with a projection extending into registry with one of said openings and also provided with a through passage, and a valve for controlling said passage, arranged in registry with the other opening.

3. The combination of a pipe portion provided with an internal seat and with two lateral openings on opposite sides of said seat, the diameter of one of said openings being greater than that of said seat, means for closing said openings, a carrier adapted to fit said seat and provided with a through passage, and a valve for controlling said passage, arranged in registry with the other opening.

4. The combination of a pipe portion provided with an internal seat and with two lateral openings on opposite sides of said seat, the diameter of one of said openings being greater than that of said seat, means for closing said openings, a carrier adapted to fit said seat and provided with a through passage, and a valve for controlling said passage.

5. The combination of a pipe portion provided with an internal seat, a large opening at one side of said seat, a smaller opening on the other side of the seat, a carrier adapted to be inserted and removed through the larger opening and to fit said seat, said carrier having a through passage, a valve mounted on said carrier and controlling the passage thereof, said valve registering with the smaller opening, and means for closing said openings.

6. The combination of a pipe portion provided with an internal seat, a removable valve carrier adapted to fit said seat and provided with a through passage, a valve controlling said passage, an opening on one side of the carrier, through which said valve is accessible for operation, and a filling opening located on the other side of the carrier and adjacent thereto.

In testimony whereof I have signed this specification in the presence of the two subscribing witnesses.

JOHN ELDER.

Witnesses:
 JOHN LOTKA,
 CHARLES MATHÉ.